Jan. 29, 1952     I. E. SCHULTZ     2,583,970
AUTOMATIC BRAKE ADJUSTING MECHANISM
Filed Sept. 12, 1949
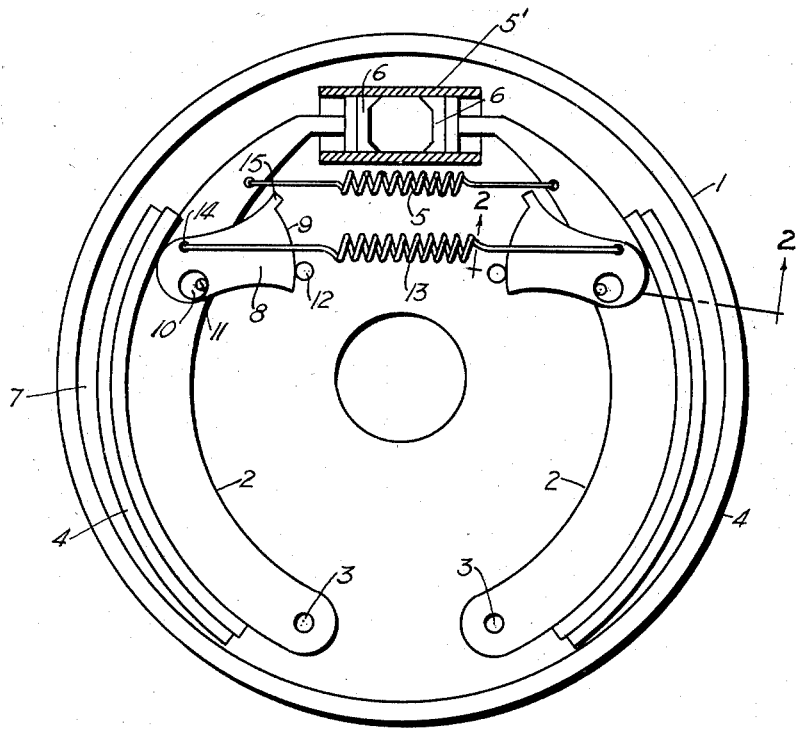
Fig. 1
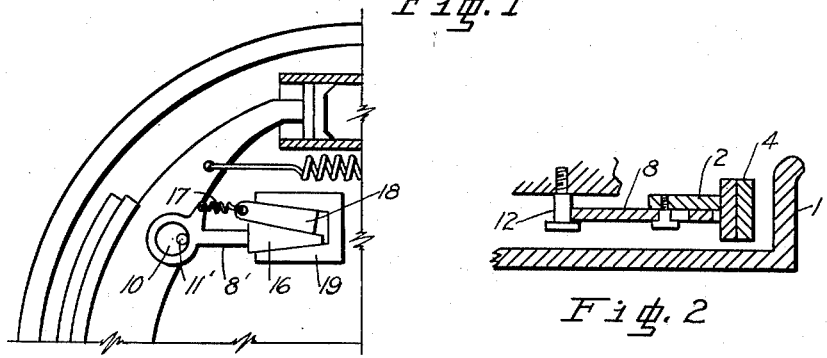
Fig. 2
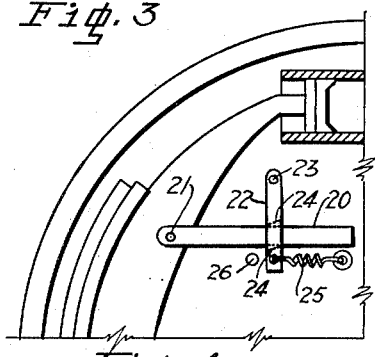
Fig. 3
Fig. 4
INVENTOR.
*Ira E. Schultz*
BY
*a. Schapp*
ATTORNEY Patented Jan. 29, 1952

2,583,970

UNITED STATES PATENT OFFICE 2,583,970

AUTOMATIC BRAKE ADJUSTING MECHANISM

Ira E. Schultz, Johannesburg, Transvaal, Union of South Africa

Application September 12, 1949, Serial No. 115,139

1 Claim. (Cl. 188—79.5)

The present invention relates to a brake mechanism and has particular reference to an hydraulic brake for a motor vehicle in which the brake pedal moves the brake shoe a given distance from any starting point to which it may have been retracted.

In a brake mechanism of this character, as the brake lining wears down under continuous use, the clearance between the brake drum and the brake shoe increases gradually and after a certain period of use becomes so large that the brake shoe fails to reach the brake drum for braking action and the brake mechanism becomes ineffective.

In hydraulic brakes of this type provision is usually made for adjusting the brake shoe so as to advance its starting position toward the brake drum and to thereby reduce the clearance so as to bring the latter back to normal commensurate with the pre-determined travel of the brake shoe in response to actuation of the brake pedal.

In hydraulic brakes in use at the present time this adjustment is made manually and it is usually necessary for the operators of the motor vehicles to call at a brake adjusting station to have the adjustment made.

In the present invention it is proposed to provide means whereby this adjustment is made automatically and in immediate response to any increase in the clearance between the brake drum and the brake shoe in its starting or retracted position.

My invention thus makes it unnecessary for the operator of a motor vehicle to have the brakes adjusted periodically but it also keeps the brakes in perfect adjustment at all times and eliminates a great road hazard insofar as it avoids the often extended period of poor brake adjustment naturally occurring before the driver's attention is called to the fact that the brakes need adjusting.

The preferred forms of my invention are illustrated in the accompanying drawing, in which Figure 1 shows an inside view of a brake drum having my brake mechanism incorporated therein, Figure 2, a section taken along line 2—2 of Figure 1, Figure 3, a fragmentary view similar to that of Figure 1 and showing a modified form of my invention, and Figure 4, a view similar to that of Figure 3 and showing a still further modified form.

While I have shown only the preferred forms of my invention, I wish to have it understood that various changes and modifications may be made within the scope of the claim attached hereto without departing from the spirit of the invention.

Referring to the drawing in detail, the brake mechanism in its general characteristics may be of conventional form and includes a brake drum 1, a pair of brake shoes 2 pivoted therein as at 3 and provided with the brake linings 4, a spring 5 tending to draw the free ends of the brake shoes toward one another, and a cylinder 5' having plungers 6 bearing upon the free ends of the brake shoes for crowding the same toward the brake drum when a liquid is forced into the cylinder 5' in the manner customarily employed in hydraulic brakes.

In mechanisms of this type the brake pedal moves the brake shoes a given distance from any initial position, and it is essential therefore that the clearance 7 between the brake drum and the brake shoes be adjusted so as to correspond substantially to the given travel of the brake shoes or rather so as to allow the brake shoes to be forced into braking contact with the drum.

Assuming that originally the brake shoes have been properly adjusted to the correct clearance, it is apparent that the clearance will increase as the lining of the brake shoes begins to wear, and it is the principal idea of the present invention to provide means whereby the brake shoes automatically adjust themselves to always maintain the same clearance regardless of wear.

For this purpose I provide, in the preferred form of Figures 1 and 2, a control member 8 in the form of a somewhat elongated plate having a rear edge formed to provide a cam 9 and having a hole 10 in the lower front portion thereof, the hole engaging over a pin 11 projecting from the brake shoe. The pin 11 is much smaller than the hole 10 and is intended to provide a certain amount of play or lost motion sufficient to normally allow the brake shoe to bridge the clearance for braking action without affecting the control member 8.

The cam 9 of the control member bears against a fixed pin 12, and the two control members of the two brake shoes are interconnected by a spring 13 engaging the control members in their upper rear portions as at 14, the function of the spring being to urge the cams 9 into wedging engagement with the pins 12.

In operation, as long as the brake shoes are properly adjusted, the pin 11 will merely ride from one edge of the hole 10 to the opposite edge during each braking operation without in any manner affecting the control member 8. When however, the lining 4 begins to wear and to increase the clearance 7, the pin 11 will go slightly beyond the play allowed by the hole 10, and bearing on the rim of the hole will crowd the lower front portion of the control member forward, with the result that the cam 9 wedges downward against the pin 12. Since in its new position the control member 8 is firmly wedged at its rear end it cannot retract, and it is apparent that the slight advance of the hole 10 limits the rearward movement of the brake shoe to reduce the width of the clearance 7 and to bring the same back to normal. In this manner the control member 8 while not interfering with the normal operation of the brake shoe keeps pushing the starting position forward in response to any increase in the clearance, and as a consequence the clearance will remain constant regardless of the wearing down of the lining surface resulting in perfect braking action at all times.

A stop 15 limits the downward movement of the cam face 9.

Suitable provision should be made to render temperature changes a negligible factor in the operation of my control element. If the brake drum expands under the influence of heat, it is apparent that the control members should be made to expand an approximately equal amount because otherwise the pin 11 might drag the control member forward to bring the brake shoe too close to the drum when the latter cools. There is also to be considered the question of unequal heating at the brake drum and at the control element due to excessive friction, and to overcome unequal expansion due to unequal temperatures, the control member 8 might be made of a material having a higher expansion coefficient than that of the drum. Problems arising in this connection will have to be solved experimentally on the basis of general specifications employed.

The modified form shown in Figure 3 employs substantially the same principle, a pin 11' playing in the hole 10 for normal advance of the brake shoe, and tending to pull the control member 8' forward in case of abnormal advance occasioned by an increase in the clearance between the drum and the brake shoe.

In this form the control member 8' terminates, at its rear end, in a wedge 16 slidable in a housing 19 and locked against rearward motion by a second wedge 18 normally urged forward by a spring 17. In case of an abnormal advance of the control member 8', the wedge 16 is dragged forward by the pin 11', and the wedge 18 is pulled forward by the spring 17 to automatically lock the control member against reversed motion from its new position of advance.

In the form shown in Figure 4 a similar effect is obtained by means of a rod 20 pivoted to the brake shoe as at 21 and supported in a link 22 pivoted as at 23, the rod being slidable in a slot in the link having slanting upper and lower walls 24. A spring 25 tends to draw the link rearward and a pin 26 mounted forwardly of the link limits the advance of the latter.

In operation, the rod 20 is free to move forward along with the brake shoe until the latter engages the brake drum. The rearward movement of the rod 20 is limited by the binding action between the rod and the link on the backward swing of the latter. Since the forward swing of the link is limited by the pin 26 the rod 20 will advance in the slot in response to any increase in the clearance 7 so as to allow the link to take a new bite for establishing a new limit for the rearward movement of the brake shoe.

I claim:

In a brake mechanism, a brake drum, a brake shoe mounted to normally provide a desired clearance between the shoe and the drum, means operable for advancing the brake shoe toward the drum, a pin projecting sidewise from the shoe, an elongated control plate having a hole in its outer end through which the pin extends, the hole being larger than the pin so as to allow of play of the pin in the hole corresponding to the normal clearance between the shoe and the drum and to leave the control plate unaffected by an advance of the brake shoe through the normal clearance, but to cause the control plate to be dragged outward when the brake shoe advances through a distance greater than the normal clearance, a fixed pin mounted inside the shoe and substantially on a level with the first pin, the control plate having an arcuate inner edge cooperable with the fixed pin in locking the plate against inward movement, and the said edge being cam shaped for wedging against the fixed pin when the plate is dragged outward to prevent return movement from a position of advance, and means biasing the plate toward wedging action.

IRA E. SCHULTZ.

REFERENCES CITED

The following references are of record in the file of this patent:

UNITED STATES PATENTS

| Number | Name | Date |
|---|---|---|
| 2,165,076 | Smith | July 4, 1939 |
| 2,186,264 | Nachtwey | Jan. 9, 1940 |
| 2,196,137 | Brown | Apr. 2, 1940 |
| 2,239,172 | Ludwig | Apr. 22, 1941 |
| 2,291,662 | Thibeault | Aug. 4, 1942 |
| 2,327,819 | Robeson | Aug. 24, 1943 |
| 2,345,062 | Nachtwey | Mar. 28, 1944 |
| 2,465,063 | Cleveland | Mar. 22, 1949 |